United States Patent
Cernay et al.

(10) Patent No.: US 9,334,747 B2
(45) Date of Patent: May 10, 2016

(54) APPARATUS AND METHOD FOR SECURING SEALING ELEMENTS

(71) Applicant: MTU Aero Engines AG, Munich (DE)

(72) Inventors: Christoph Cernay, Bruckmuhl (DE); Wolfgang Schmidmayr, Munich (DE); Thomas Hess, Munich (DE); Julian Weber, Munich (DE)

(73) Assignee: MTU AERO ENGINES AG, Munich (DE)

( * ) Notice: Subject to any disclaimer, the term of this patent is extended or adjusted under 35 U.S.C. 154(b) by 0 days.

(21) Appl. No.: 14/780,804

(22) PCT Filed: Apr. 4, 2014

(86) PCT No.: PCT/DE2014/000174
§ 371 (c)(1),
(2) Date: Sep. 28, 2015

(87) PCT Pub. No.: WO2014/161527
PCT Pub. Date: Oct. 9, 2014

(65) Prior Publication Data
US 2016/0047262 A1 Feb. 18, 2016

(30) Foreign Application Priority Data

Apr. 4, 2013 (DE) .......................... 10 2013 205 922

(51) Int. Cl.
| | |
|---|---|
| *F01D 11/02* | (2006.01) |
| *F01D 11/00* | (2006.01) |
| *F02C 7/28* | (2006.01) |
| *F16J 15/32* | (2016.01) |

(Continued)

(52) U.S. Cl.
CPC .............. *F01D 11/02* (2013.01); *B22F 3/1055* (2013.01); *F01D 11/001* (2013.01); *F01D 11/08* (2013.01); *F02C 7/28* (2013.01); *F16J 15/3252* (2013.01); *F16J 15/3288* (2013.01); *B33Y 10/00* (2014.12); *B33Y 80/00* (2014.12); *F05D 2220/30* (2013.01);
(Continued)

(58) Field of Classification Search
CPC . F16J 15/3252; F16J 15/3268; F16J 15/3284; F16J 15/3288; F16J 15/3292; F01D 11/02
See application file for complete search history.

(56) References Cited

U.S. PATENT DOCUMENTS

| | | | | |
|---|---|---|---|---|
| 5,265,412 A | * | 11/1993 | Bagepalli | F01D 9/023 277/355 |
| 6,357,672 B1 | * | 3/2002 | Cowan | B64C 15/02 239/265.19 |

(Continued)

FOREIGN PATENT DOCUMENTS

| | | |
|---|---|---|
| DE | 102010021923 A1 | 12/2011 |
| EP | 1890056 A1 | 2/2008 |

(Continued)

*Primary Examiner* — Gilbert Lee
(74) *Attorney, Agent, or Firm* — Barlow, Josephs & Holmes, Ltd.

(57) ABSTRACT

The invention relates to an apparatus (10) for securing sealing elements (12, 14) in a recess (16), more particularly in an installation slot in a turbomachine, having at least one sealing support element (18) comprising at least one sealing element (12, 14). At least one fixing piece (20) is fitted between the sealing support element (18) and a clamping piece (22) associated with the sealing support element (18), and the fixing piece (20) is integrally joined to the sealing support element (18) and the clamping piece (22) by strut-like connections (24) that can be broken by the application of force. The invention also relates to a securing method and to a method for manufacturing the claimed apparatus (10).

15 Claims, 2 Drawing Sheets

(51) Int. Cl.
*B22F 3/105* (2006.01)
*F01D 11/08* (2006.01)
*B33Y 10/00* (2015.01)
*B33Y 80/00* (2015.01)

(52) U.S. Cl.
CPC ......... *F05D 2240/55* (2013.01); *F05D 2240/56* (2013.01)

(56) References Cited

U.S. PATENT DOCUMENTS

| | | | | |
|---|---|---|---|---|
| 2005/0116423 A1* | 6/2005 | Beichl | .................. | F16J 15/3288 277/355 |
| 2010/0320701 A1* | 12/2010 | Groom | .................. | F01D 11/025 277/628 |
| 2011/0018204 A1* | 1/2011 | Beichl | .................. | F16J 15/3288 277/300 |
| 2011/0049810 A1* | 3/2011 | Ferryman | ............. | F28D 19/047 277/355 |
| 2015/0093235 A1* | 4/2015 | Stiehler | ................ | F16J 15/3268 415/111 |

FOREIGN PATENT DOCUMENTS

| | | |
|---|---|---|
| WO | 9712125 A2 | 4/1997 |
| WO | 03/025216 A1 | 7/2003 |

* cited by examiner

APPARATUS AND METHOD FOR SECURING SEALING ELEMENTS

BACKGROUND OF THE INVENTION

The invention relates to an apparatus and a method for securing sealing elements in a recess, particularly in an installation slot formed in a turbomachine, the apparatus having at least one sealing support element comprising at least one sealing element. The invention also relates to a method for manufacturing a corresponding apparatus.

These types of sealing elements or systems have particularly come into use in the case of so-called gap support systems in compressor and turbine components of turbomachines. In this case, these types of sealing systems have the task of minimally maintaining a sealing gap for a rotating component, e.g., a blading, relative to a stationary component, e.g., a housing or casing of the turbomachine, and thus guaranteeing a stable operating performance with high efficiency. The named sealing systems may involve so-called brush seals or labyrinth seals. In this case, e.g., for securing mounting plates for brush seals, usually recesses or installation slots having an undercut are required in the respective component. The housing plates used are wedged into these installation slots with the undercut and fixed in place by a corresponding deformation of the housing plates in the installation slot. Wedging wires are usually used for securing labyrinth seals in U-shaped installation slots. It is a disadvantage, however, in that in the known apparatuses and methods for securing sealing elements in a recess, that these apparatuses are very complex in their configuration and therefore time-consuming in their installation. Also, additional elements, such as, e.g., the named wedging wires are required.

BRIEF SUMMARY OF THE INVENTION

An object of the present invention is to create an apparatus and a method for securing sealing elements in a recess, which ensure a simplified and rapid installation of the sealing elements. Another object of the invention is to manufacture an apparatus of generic type in a dimensionally accurate shape and in a cost-effective manner.

The objects are achieved by an apparatus, a securing method, as well as a manufacturing method of the present invention. Advantageous embodiments of the invention are discussed in detail below, wherein advantageous embodiments of the apparatus can be viewed as advantageous embodiments of the securing method according to the invention and vice versa.

An apparatus according to the invention for securing sealing elements in a recess, in particular in an installation slot formed in a turbomachine, has at least one sealing support element comprising at least one sealing element. In this case, at least one fixing piece is disposed between the sealing support element and a clamping piece associated with the sealing support element, wherein the fixing piece can be joined integrally to the sealing support element and to the clamping piece by strut-like connections that can be broken by means of applying force. Due to the configuration of the apparatus for securing sealing elements according to the invention, a simplified and rapid installation of the sealing elements is given, so that complex grooves or slots with an undercut as well as additional fastening elements can be dispensed with, since the fixing piece in the wedged state assures a force closure between the apparatus according to the invention and the recess or the side walls of the recess. Thus, in an advantageous embodiment of the apparatus according to the invention, the fixing piece is designed in such a way that when the connection between the fixing piece and the sealing support element, on the one hand, and between the clamping piece and the fixing piece, on the other hand, is broken, a force closure takes place between the fixing piece, the sealing support element, the clamping piece, and side walls of the recess. In this way, a secure fastening of the apparatus according to the invention in the installation slot or in the recess is assured due to the force closure. Also, the securing of the apparatus according to the invention is possible due to a simple wedging of the fixing piece and the force closure following therefrom.

In additional advantageous embodiments of the apparatus according to the invention, the sealing support element is formed as the housing for the uptake of the sealing element. The sealing element in this case may be formed as a brush seal. In addition, it is possible that the sealing support element is designed as the base element of the sealing element, wherein the sealing element is a labyrinth seal with corresponding labyrinth fins.

In another advantageous embodiment of the apparatus according to the invention, the strut-like connections are designed in such a way that they are formed by the sealing support element and the corresponding opposite-lying clamping piece, in each case projecting with the formation of an angle pointing in the direction of the recess or the installation slot. After the wedging and breaking of the fixing piece from the strut-like connections in order to achieve the above-mentioned force closure, the obliquely placed connection struts prevent the fixing piece from sliding back due to the mechanical clamping that ensues, based on their arrangement and formation. In turn, a secure fastening of the sealing elements in the recess is assured thereby.

In additional advantageous embodiments of the apparatus according to the invention, a space is formed between the sealing support element and the opposite-lying clamping piece for the uptake of the fixing piece, this space tapering in the direction of the recess. By wedging a correspondingly shaped fixing piece therein, the sealing support element and the clamping piece move away from one another in different directions and are correspondingly fixed in place in the recess. A free space can be formed in this case between an end of the fixing piece pointing in the direction of the recess and a base of the recess. The distance between the end of the fixing piece and the base of the recess can be defined in advance for defining the magnitude of the force closure between the individual elements of the apparatus according to the invention.

In additional advantageous embodiments of the apparatus according to the invention, the fixing piece is designed to taper in the direction of the recess. In this case, the fixing piece can be designed in the shape of a wedge or truncated cone. In the interaction with the space formed between the sealing support element and the opposite-lying clamping piece due to this shape of the fixing piece, a secure force closure results between the named elements after breaking the fixing piece off from the strut-like connections and wedging it in the direction of the recess. Other shapes, however, are also conceivable for the fixing piece. The shape of the fixing piece in each case thus must be adapted to the space formed between the sealing support element and the opposite-lying clamping piece. It is a deciding factor here that after breaking the connection between the fixing piece and both the sealing support element and the clamping piece, there is a force closure between the fixing piece, the sealing support element, the clamping piece, and the side walls of the recess.

In further advantageous embodiments of the apparatus according to the invention, the fixing piece, the sealing support element, the clamping piece, as well as the strut-like connections are formed in one piece. The one-piece or integral manufacture of the apparatus according to the invention is particularly carried out by means of a generative or additive manufacturing method. It is also possible that the fixing piece, the sealing support element, the clamping piece, the strut-like connections as well as the sealing element formed as the labyrinth seal are also formed in one piece. Here also, the integral manufacture of the apparatus can be carried out by means of an additive manufacturing method.

In addition, the invention relates to a method for securing sealing elements in a recess, in particular in an installation slot formed in a turbomachine, with the use of an apparatus as described in the preceding, wherein the method comprises the following steps:

a) introduction of the apparatus into the recess;

b) introduction of a force in the direction of the recess onto the fixing piece in such a way that the connection between the fixing piece and the sealing support element, on the one hand, and between the clamping piece and the fixing piece, on the other hand, is broken; and c) further introduction of the force onto the fixing piece until a force closure results between the fixing piece, the sealing support element, the clamping piece, and side walls of the recess.

A simple and rapid installation of the sealing element in the corresponding recess is assured by this method. Additional fastening elements or a special and complex configuration of the recess can advantageously be dispensed with.

In addition, the invention relates to a method for manufacturing an apparatus according to the invention, as described in the preceding. In this case, the apparatus according to the invention is produced by means of an additive manufacturing method. The additive manufacturing method can be a selective laser melting method or a selective laser sintering method. Other additive manufacturing methods are also conceivable. Due to the use of additive manufacturing methods, a dimensionally accurate and cost-effective manufacture of the apparatus according to the invention for securing sealing elements is possible.

BRIEF DESCRIPTION OF THE DRAWINGS

Herein.

DETAILED DESCRIPTION OF THE INVENTION

Figure 1:
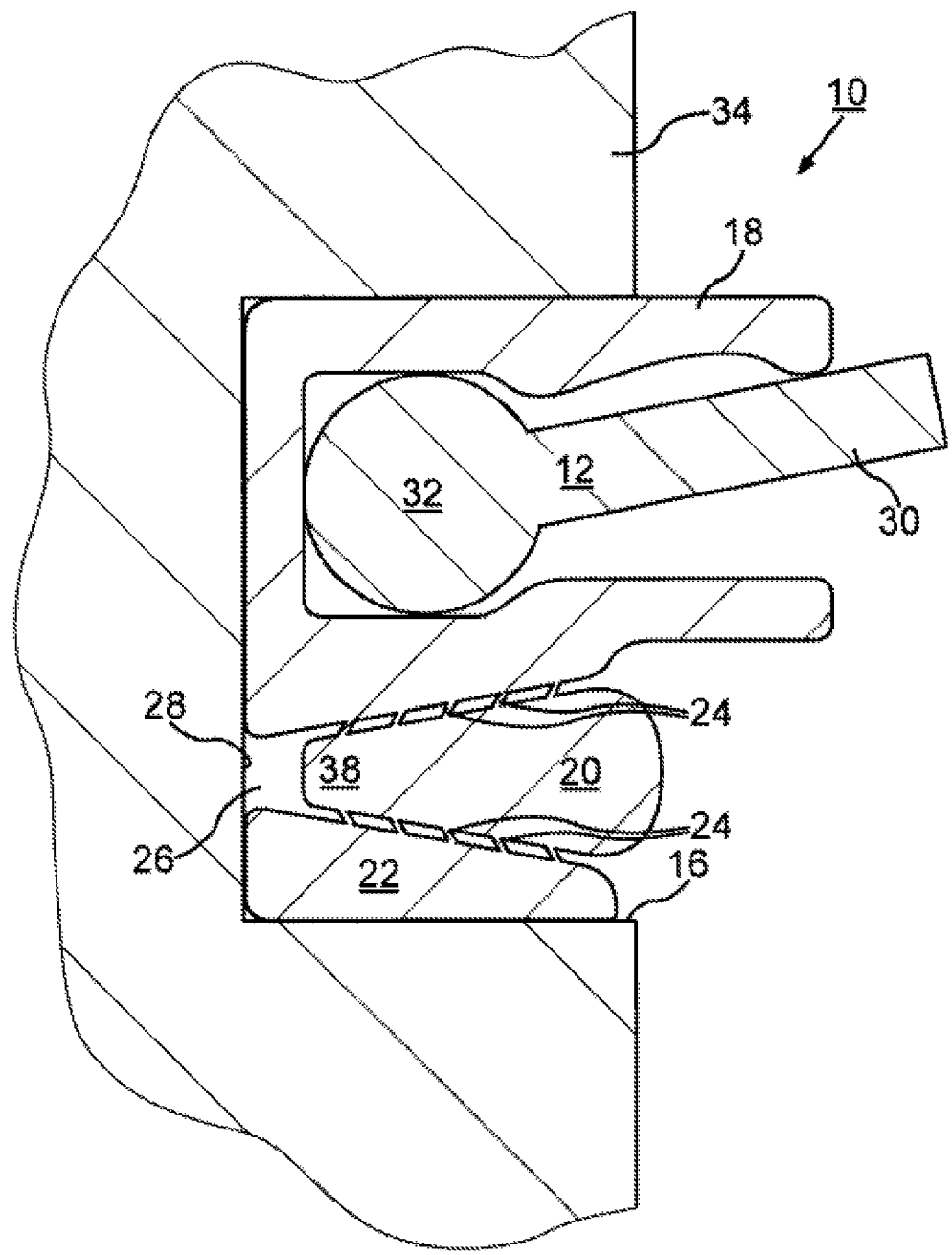
FIG. 1 shows a schematic sectional view of a first embodiment of the apparatus according to the invention.

The first embodiment of an apparatus 10 for securing sealing elements, which is shown in FIG. 1, comprises a sealing support element 18, a fixing piece 20, and a clamping piece 22 associated with the sealing support element 18. The fixing piece 20 in this case is fixed in place between the sealing support element 18 and the clamping piece 22 by means of strut-like connections 24. In the exemplary embodiment shown, the sealing support element 18 is formed as a housing for accommodating a brush seal. In this case, the sealing element 12, which is designed as a brush seal, is composed of a plurality of bristles 30, which are shown schematically and which are wound around a unit 32 composed of a clamping ring and a core of the brush seal. The thickened end of the brush seal or the unit 32 is thus mounted inside the sealing support element 18, which is formed as the housing, wherein the inner walls of the housing are formed in such a way that a secure fixation of the brush seal in the housing is assured. The construction of the brush seal corresponds to that of known brush seals.

The apparatus 10 is disposed in a recess 16. In the exemplary embodiment shown, the recess 16 is an installation slot formed in a component 34 of a turbomachine. The turbomachine may involve a steam or gas turbine or an aircraft engine, in particular a compressor or a turbine of an aircraft engine.

In addition, it can be recognized that the fixing piece 20 is shaped like a wedge in the exemplary embodiment shown, wherein the fixing piece 20 tapers in the direction of the recess 16 or of a base 28 of the recess 16. The same applies to a space, which is formed between the sealing support element 18 and the opposite-lying clamping piece 22, for receiving the fixing piece 20. This is also formed to taper in the direction of the recess 16. The fixing piece 20 is broken off from the strut-like connections 24 with appropriate application of force, by wedging the fixing piece 20 in the direction of the recess 16 or of the base 28 of the recess 16 (not shown). By breaking the connection between the fixing piece 20 and the sealing support element and the clamping piece 22, a force closure arises between the fixing piece 20, the sealing support element 18, the clamping piece 22, and the side walls of the recess 16. The fixing piece 20 presses both the sealing support element 18 as well as the clamping piece 22 against the side walls of the recess 16 and thus fixes the apparatus 10 inside the recess 16. The strut-like connections 24 are formed in such a way that they each project from the sealing support element 18 and the opposite-lying clamping piece 22 with the formation of an angle pointing in the direction of the recess 16 or of the base 28 of the recess 16. It is assured by this oblique positioning of the connections 24 that the fixing piece 20 can no longer slide out from the recess 16 after the strut-like connections 24 are broken off.

In addition, it is clear that a space 26 is formed between an end 38 of the fixing piece 20, which faces the base 28 of the recess 16, and the base 28 of the recess 16. The wedging of the fixing piece 20 in the direction of the installation slot 16 is made possible and is also limited by distancing the end 38 from the base 28.

The fixing piece 20, the sealing support element 18, the clamping piece 22, as well as the strut-like connections 24 are formed in one piece. The configuration of the apparatus 10 also makes it possible that the brush seal can be inserted into the housing even before the installation of the brush seal housing into the recess 16.

Figure 2:
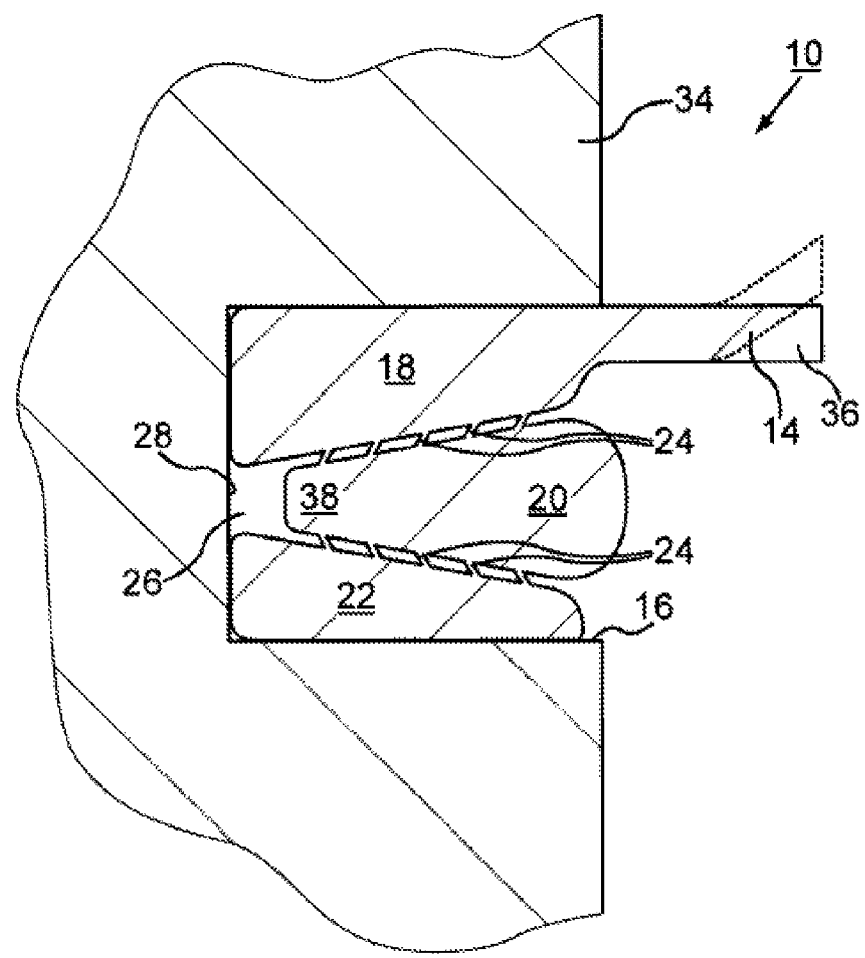
FIG. 2 shows a schematic sectional view of a second embodiment of the apparatus according to the invention.

FIG. 2 shows a schematic sectional view of a second embodiment of the apparatus 10. In this case, the sealing element 14 is formed as a labyrinth seal with corresponding labyrinth fins 36. The sealing support element 18 forms a base element of the sealing element 14 or of the labyrinth seal. The tips of the labyrinth fins 36 can also be formed bent at an angle in this case (see dotted-line representation). The fixing piece 20 is also disposed between the sealing support element 18 and the corresponding clamping piece 22 in the second exemplary embodiment. The fixing piece 20 in turn is integrally joined to the sealing support element 18 and the clamping piece 22 via the strut-like connections 24 that can be broken off by means of applying force. Unlike in the first exemplary embodiment shown in FIG. 1, not only the fixing piece 20, the sealing support element 18, the clamping piece 22, and the strut-like connections 24, but also the sealing element 14 formed as a labyrinth seal are manufactured integrally or formed in one piece in the second exemplary embodiment. Relative to the other features, reference is made to the description of the first exemplary embodiment in FIG. 1.

The apparatuses 10 shown in FIGS. 1 and 2 are produced by means of an additive manufacturing method, in particular a selective laser melting or selective laser sintering method. In this case, a two-stage process is preferably performed repeatedly, wherein a uniform powder bed is provided in a first step of the two-stage process. In a second step, the powder of the powder bed is selectively welded and solidified on the basis of layers produced from a three-dimensional CAD pattern. By repeatedly executing this two-stage process, the apparatus 10 to be produced is constructed layer by layer and thus successively. The powder provided in the first step, in this case, is composed of metal, a metal alloy, ceramics or plastic. Other additive manufacturing methods can also be used. Due to the use of additive manufacturing methods, geometric freedom results advantageously relative to the configuration of the apparatus overall and of the sealing support element 18 in particular, especially in the case of the configuration of brush seal housings or also in the case of shaping the fins of the labyrinth seal. It is also possible without anything further to carry out variations in the material thickness of the individual elements of the apparatus 10.

The invention claimed is:

1. An apparatus for securing sealing elements (12, 14) in an installation slot formed in a turbomachine, having at least one sealing support element (18) comprising at least one sealing element (12, 14) wherein at least one fixing piece (20) is disposed between the sealing support element (18) and a clamping piece (22) associated with the sealing support element (18), wherein the fixing piece (20) can be joined integrally to the sealing support element (18) and to the clamping piece (22) by strut-like connections (24) that can be broken off by means of applying force.

2. The apparatus according to claim 1, wherein the fixing piece (20) is formed in such a way that when the connection is broken between the fixing piece (20) and the sealing support element (18), and between the clamping piece (22) and the fixing piece (20), a force closure is achieved between the fixing piece (20), the sealing support element (18), the clamping piece (22) and side walls of the recess (16).

3. The apparatus according to claim 1 wherein the sealing support element (18) is formed as a housing for the uptake of the sealing element (12).

4. The apparatus according to claim 3, wherein the sealing element (12) is formed as a brush seal.

5. The apparatus according to claim 1, wherein the sealing support element (18) is designed as the base element of the sealing element (14), wherein the sealing element (14) is a labyrinth seal.

6. The apparatus according to claim 5, wherein the fixing piece (20), the sealing support element (18), the clamping piece (22), the strut-like connections (24) and the sealing element (14), which is a labyrinth seal, are formed in one piece.

7. The apparatus according to claim 1, wherein the strut-like connections (24), each projecting from the sealing support element (18) and the corresponding opposite-lying clamping piece (22) are configured with the formation of an angle pointing in the direction of the recess (16).

8. The apparatus according to claim 1, wherein a space formed between the sealing support element (18) and the opposite-lying clamping piece (22) is tapers in the direction of the recess (16) for the uptake of the fixing piece (20).

9. The apparatus according to claim 1, wherein a free space (26) resides between an end (38) of the fixing piece (20) pointing in the direction of the recess (16) and a base (28) of the recess (16).

10. The apparatus according to claim 1, wherein the fixing piece (20) tapers in the direction of the recess (16).

11. The apparatus according to claim 10, wherein the fixing piece (20) is has a shape of a wedge or truncated cone.

12. The apparatus according to claim 1, wherein the fixing piece (20), the sealing support element (18), the clamping piece (22), and the strut-like connections (24) are formed in one piece.

13. The apparatus according to claim 1, wherein:
a) the apparatus (10) resides in a recess (16);
b) an introduction of a force in the direction of the recess (16) onto the fixing piece (20) causes the connection between the fixing piece (20) and the sealing support element (18), and between the clamping piece (22) and the fixing piece (20), to be broken; and
c) further introduction of force onto the fixing piece (20) until a force closure results between the fixing piece (20), the sealing support element (18), the clamping piece (22), and side walls of the recess (16).

14. The apparatus according to claim 1, wherein the apparatus (10) is produced by an additive manufacturing method.

15. The apparatus according to claim 14, wherein the additive manufacturing method is a selective laser melting method or a selective laser sintering method.

* * * * *